United States Patent [19]

Gustin

[11] 4,246,870
[45] Jan. 27, 1981

[54] AUTOMATIC DRINKING-TROUGHS

[75] Inventor: Jean-Pierre R. Gustin, Charleville-Dezieres, France

[73] Assignee: La Buvette S.A., Charleville-Mezieres, France

[21] Appl. No.: 973,709

[22] Filed: Dec. 27, 1978

[30] Foreign Application Priority Data

Jan. 4, 1978 [FR] France .............................. 78 00118

[51] Int. Cl.³ .............................................. A01K 7/06
[52] U.S. Cl. ..................................................... 119/75
[58] Field of Search ..................... 119/75, 72.5, 71, 72

[56] References Cited

U.S. PATENT DOCUMENTS

| 3,144,003 | 8/1964 | Jacobs | 119/75 |
| 3,144,853 | 8/1964 | Blough | 119/75 |
| 3,357,406 | 12/1967 | Robinson | 119/75 X |
| 3,734,063 | 5/1973 | Atchley | 119/72.5 |

FOREIGN PATENT DOCUMENTS 1907945 10/1970 Fed. Rep. of Germany ............. 119/75

Primary Examiner—Hugh R. Chamblee
Attorney, Agent, or Firm—Darby & Darby

[57] ABSTRACT

An automatic drinking-trough which can only be used by animals for drinking purposes has a pressurized water duct the aperture of which is closed by a valve. The opening of the valve is controlled by a tube displaceable in all directions. The valve is arranged under a hood situated above the bowl, with the end of the control tube protruding vertically below the hood and in the bottom of the bowl. Thus the animal has to drive its snout down to the bottom of the bowl in order to reach the tube and cannot tamper with it inadvertably or playfully.

4 Claims, 1 Drawing Figure

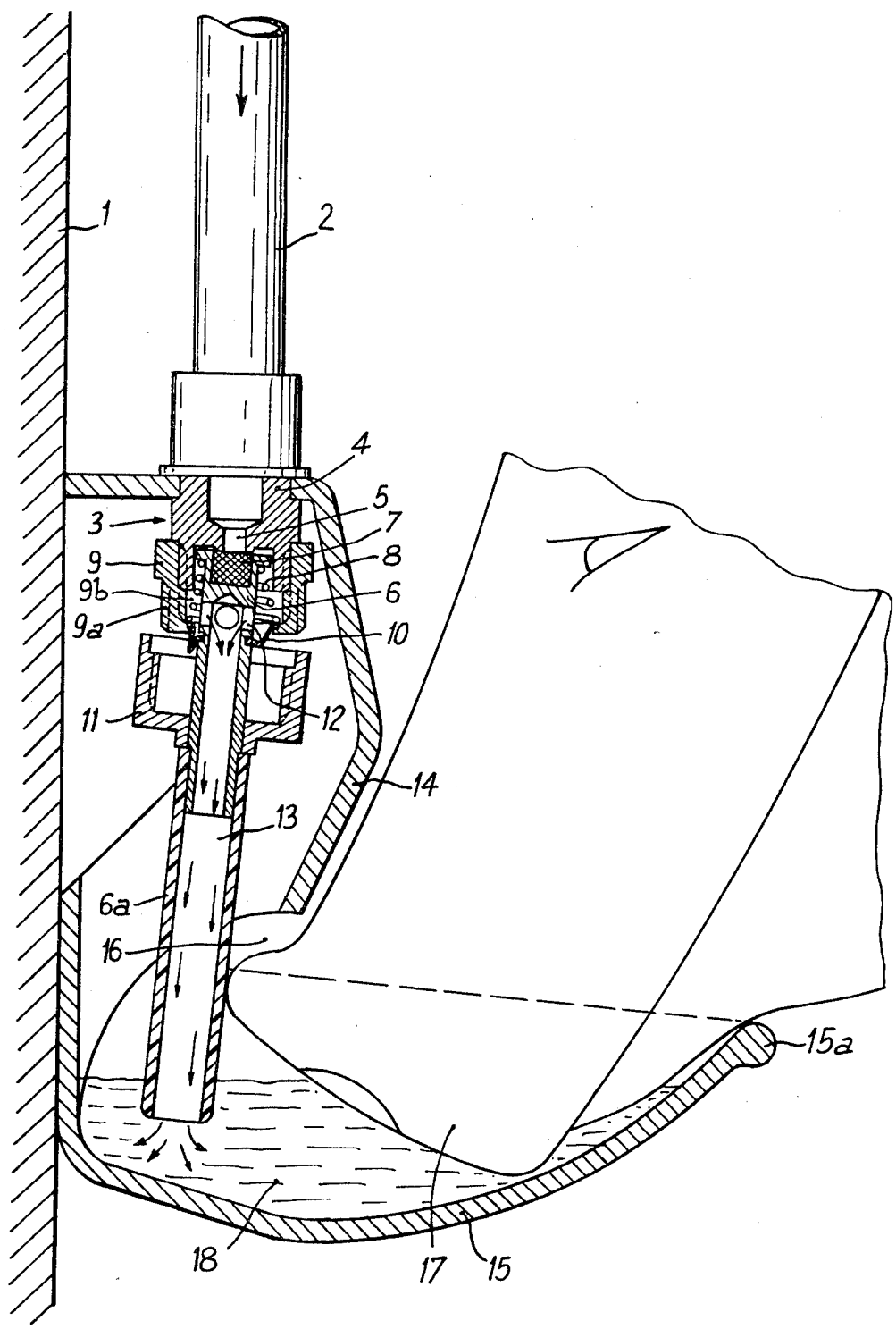

AUTOMATIC DRINKING-TROUGHS

BACKGROUND OF THE INVENTION

The present invention relates to an improvement to automatic watering devices for animals.

It is known to make automatic drinking-troughs by providing a bowl above which is arranged a pallet mobile about a horizontal axis. The animal, by exerting a pressure on said pallet, operates a tap from which flows water into the bowl standing under said pallet.

It has proved that this type of device did not give satisfactory results with some animals such as piglets since they operate correctly only if the pressure is exerted in a direction perpendicular to the rotation axis of the pallet, whereas such animals exert their action in a very confused manner.

Therefore, it has been proposed to place in the enclosures where the animals are kept, taps called teats, operated by a central tube, said tube causing the opening of the duct whatever the direction in which they are operated and conducting the water to the mouth of the animal.

Such a disposition offers many disadvantages: some young animals have shown a tendency to play with the apparatus and cause its operation not by acting on it only with their snout, but by rubbing themselves against it, with any portion of their body so that they splatter inappropriately and waste water; moreover, some animals, and this is particularly frequent with piglets, can bite and even eat the stem which, protruding obliquely, projects sufficiently for being caught between their teeth.

SUMMARY OF THE INVENTION

The object of the present invention is to mitigate such disadvantages and relates to an automatic drinking-trough comprising a pressurized water duct the aperture of which is closed by a valve the opening of which is controlled by a tube displaceable in all directions, characterized in that said valve is arranged under a hood situated above the bowl, the end of the control tube protruding vertically below the hood and in the bottom of the bowl.

Thus, the animal will not be in a position to operate inadvertently or playfully said tube since it will have to drive its snout down to the bottom of the bowl in order to reach it. In the other hand, the hood protects the tap and fittings and its effect is that the animal will be able to come in contact only with the lower end of the control tube.

BRIEF DESCRIPTION OF THE DRAWING

As a non limitative example, and for making the invention mode apparent, a cross-sectional side view of an embodiment of the invention is shown in the accompanying drawing.

DESCRIPTION OF THE PREFERRED EMBODIMENT

Referring to said figure, one sees that the device is fixed to a wall 1, comprises a duct 2 through which is fed the pressurized water.

At the end of said duct is arranged a valve 3 made of a terminal 4 provided with an opening 5 against which is applied a closing fitting 7 carried by a tube 6 biased by a spring 8. Said spring 8 is preferably conical in shape and carried by a part 9 screwed on the terminal 4. The tube 6 extends across part 9 through an opening 10 the diameter of which is greater than the diameter of tube 6. Thus, the latter can move under the effect of a side thrust, thereby releasing partially the fitting 7 from opening 5 and allowing the water to flow.

The lower end 6a of tube 6 may have a diameter slightly different and made of a different material, as is shown in the figure.

The inner volume 9b of part 9 is in communication with the inner bore 13 of tube 6 (and of its extension 6a) through a plurality of openings 12 and bellows 10, deformable and connecting the tube 6 with part 9 so that the liquid flowing through opening 5 and spreading inside volume 9b has to pass compulsorily through openings 12. The whole tap and fittings assembly thus formed is protected by a hood 14 extending downwardly up to about the half length of portion 6a of tube 6.

Below hood 14 is arranged a bowl 15. In the example shown, the bowl 15 and the hood 14 are integral to each other, but they could also be made of two seperate parts.

The tube 6 is placed such as to be in the bottom of bowl 15 so that its end 6a appears in the space 16 enclosed between the base of hood 14 and the bowl 15 at a distance which is remote enough from the edge 15a of the bowl so that the animal cannot knock incidentally the tube 6a.

For operating tube 6a, the animal will have to thrust its snout 17 down to the bottom of the bowl, its snout dipping then in the water 18 contained in bowl 15. Thus, the animal cannot actually play with the water, it has to drink and it can reach tube 6a only for drinking.

On the other hand, tube 6 and the tap and fittings assembly being covered by hood 14, the animal cannot grab tube 6a with its teeth and damage the apparatus.

Preferably, and as is shown in the figure, the part 11 is formed with a threading 11b which may be screwed on a threading 9a of part 9 in order to block the stem 6 if it is desired to put the apparatus out of service.

I claim:
1. An automatic drinking-trough for animals for use with a water duct having an aperture through which the water exits comprising:
 a valve adapted to be connected to said duct for controlling the exit of water from said duct,
 a bowl having a bottom portion located below said valve and a rear wall,
 a control member connected to said valve for directly actuating the valve upon movement of said control member in any direction, said control member including a hollow tube through which the water leaving the valve travels to the end of said tube remote from the valve which is located adjacent both the bottom and the rear of the bowl and from which the water is discharged into the bowl with a reduced amount of splashing,
 a fixed hood for shielding said valve and a substantial portion of the length of said tube below said valve leaving an exposed portion only adjacent the bottom of the bowl to be contacted by an animal who projects a part of its body into the bowl below the end of the hood to engage the tube and move the control member to open the valve so that the water exits from the end of the tube, said valve being operable to open upon movement of the tube in any direction upon the part of the body of an animal engaging same.

2. An automatic drinking-trough according to claim 1, wherein the tube is resiliently connected to the valve by bellows to provide for the water communication with the inner bore of the tube through a plurality of apertures.

3. An automatic drinking-trough as in claim 1 wherein said tube member is of non-metallic material.

4. An automatic drinking-trough as in claim 1 wherein the lower portion of said hood below the valve and at the bottom of the hood is slanted inwardly toward the tube to provide increased access for the part of the body of the animal to the lower end of the tube to actuate the valve.

* * * * *